April 29, 1958 C. E. NORFORD 2,832,837

SELF-HOLDING TELEPHONE DIALING DEVICE

Filed Jan. 22, 1957

INVENTOR.

Courtney E. Norford

BY

Walter G. Finch

Attorney 2,832,837

SELF-HOLDING TELEPHONE DIALING DEVICE

Courtney E. Norford, Baltimore, Md.

Application January 22, 1957, Serial No. 635,250
6 Claims. (Cl. 179—90)

This invention relates generally to dialing tools, and more particularly it relates to a self-holding telephone dialing device.

Today, large number of dialing operations are performed on conventional desk type dial telephones. For a long time, there has been a need for a satisfactory self-holding telephone dialing device which can be used efficiently to dial telephone numbers without the use of the finger tips. Numerous dial tools or devices have been proposed, but have been discarded because they have been uneconomical to manufacture and inefficient and unreliable in operational use.

It is an object of this invention, therefore, to provide a novel self-holding telephone dialing device or tool for use with dial telephones having a stationary number plate and a rotatably flat disc spaced from the number plate and having apertures therein for receiving the rotatable ball end of the device.

Still another object of this invention is to provide a self-holding telephone dialing device which is compact, and which is constructed of a minimum of components; namely, a handle and a spherical element at one end of the handle.

And still another object of this invention is to provide a self-holding telephone dialing device which is economical to manufacture, efficient and reliable in operation, and which is easily maintained.

Still another object of this invention is to provide a self-holding telephone dialing device which is sturdy, and which can be used countless times for dialing operations without wear and tear thereof.

To provide a self-holding telephone dialing device or tool which is designed for dials installed at an inclined, horizontal or vertical plane, is still another object of this invention.

And still other objects of this invention are to provide a self-holding telephone dialing device or tool which can be efficiently and conveniently used for performing dialing operations and which can be effectively stored between dialing operations of a telephone.

These and other objects of this invention, as well as the attendant advantages thereof, will be readily appreciated as the same becomes better understood by reference to the following detailed description when considered in connection with the single accompanying drawing in which.

In accordance with the invention, a novel self-holding telephone dialing device is provided for use with a dial telephone having a stationary number plate and a rotatable flat disc spaced above the plate and having a plurality of apertures therein. This device includes structure defining an elongated shaped handle or body having a reduced portion at one end thereof. A spherical shaped element is mounted for rotation on the reduced portion of the handle, and it has a diameter greater than the diameter of the aperture in the flat disc. The rotatable element is arranged to rotate with the flat disc in order to eliminate wear and tear thereof.

The free end of the reduced portion of the handle has a frusto-conical taper expanding outwardly therefrom, so that when the dial device is positioned in an aperture of the flat disc, the weight thereof causes the tapered portion to engage the edge of the aperture in the flat disc so as to retain the dial device in the selected aperture of the flat disc when not in use in dialing a telephone number.

Figures 1, 2, 3, 7:
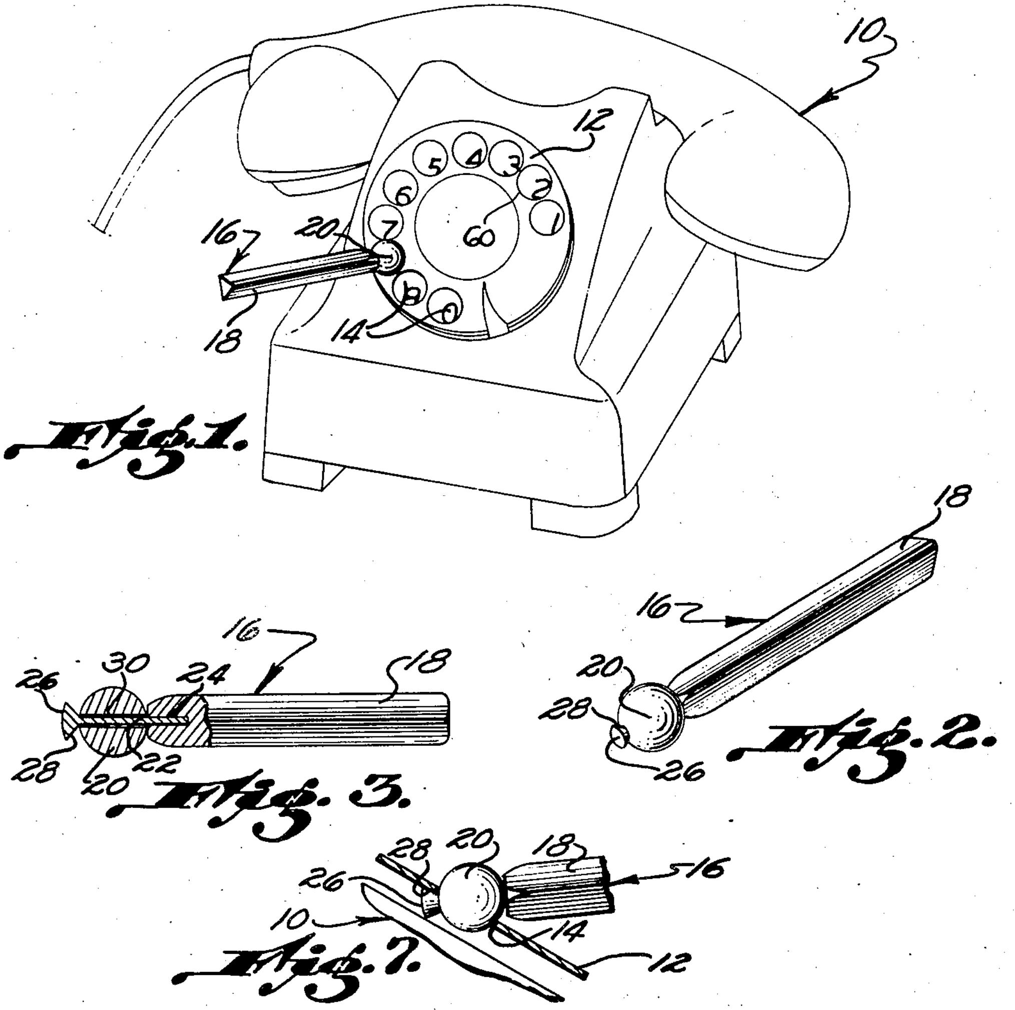
Fig. 1 is a perspective of a telephone with the dial device comprising this invention in operative position.
Fig. 2 is a perspective of a first embodiment of the dial device.
Fig. 3 is a side elevation, partially in cross-section, of the embodiment of the invention illustrated in Fig. 2.
Fig. 7 is a side elevation, partially in cross-section, of the first embodiment of the dial device illustrated in Figs. 1, 2, and 3, in operative position in a dial of a telephone.

Referring now to Fig. 1 of the drawing, there is illustrated a conventional dial telephone 10 having a flat rotatable dial disc 12 spaced from and parallel to a stationary number plate 14. The rotatable dial disc 12 has a plurality of spaced apertures 60 for receiving a spherical shaped head or element 20 secured to one end of a handle or body 18 of a self-holding telephone dial device 16. It is to be noted that the rotatable flat disc 12 as well as the number plate 14 can be mounted in horizontal, vertical or inclined parallel planes, and the device 16 will be as effective in any one of the positions selected.

In Figs. 2, 3, and 7 of the drawing, there is illustrated the detail of one embodiment of the self-holding telephone dial device 16. It consists of an elongated body or handle 18, which is perferably of a triangular cross-section but not limited thereto, because a circular, rectangular or elliptical cross-section of the body or handle would suffice.

At one end of the body or handle 18, there is located a shaft 22, which can be inserted into an aperture 24 formed in the end of the handle 18. This shaft 22 is arranged so that a spherical shaped element, such as a ball 20 having an aperture 30 can be loosely positioned thereon for rotation. By allowing the spherical shaped element or ball 20 to rotate on the shaft 22 when the flat disc 12 is rotated, wear and tear of the dialing device is minimized. The crown 26 of the shaft 22 is provided with a frusto-conical taper 28 which extends outwardly therefrom.

When the dial device 16 is positioned in an aperture 60 of the flat disc 12, the taper 28 of the crown 26 of the shaft 22 engages the edges defining the selected aperture 60, as seen best in Fig. 7. The weight of the dial device 16 causes the taper 28 of the crown 26 of the shaft 22 to engage the disc so as to retain the device or tool in the aperture 60 which was selected for dialing a telephone number.

Figure 4:
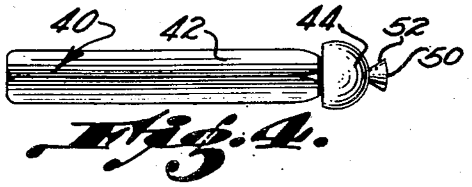
Fig. 4 is a side elevation of a second embodiment of the dial device.
Figure 5:
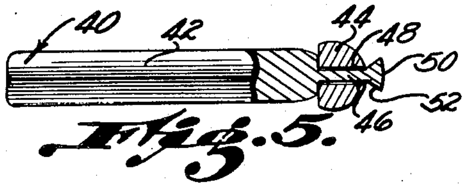
Fig. 5 is a side elevation, partially in cross-section, of a portion of the second embodiment of the dial device illustrated in Fig. 4.
Figure 6:
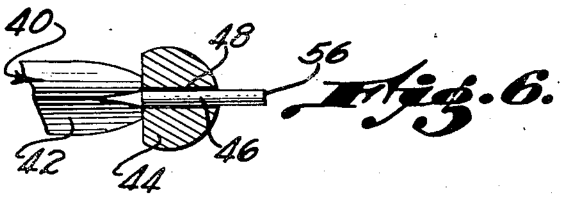
Fig. 6 is a side elevation, partially in cross-section, of a portion of the second embodiment of the dial device, illustrated in Figs. 4 and 5, before riveting or peening of the shaft.

It is to be noted that the shaft 22 can be formed integral with the handle or body 18, at one end thereof, as shown best in the embodiment of the invention illustrated in Figs. 4, 5, and 6. Here, the self-holding dialing device 40 consists of an elongated handle or body 42 having a reduced shaft portion 46 formed at one end thereof. A similar spherical shaped element 44, having an aperture 48 extending therethrough, is loosely positioned on the shaft 46 for rotation. The free end of the fixed shaft is then placed under pressure or force to cause it to form a crown 50 with a taper 52 extending and expanding outwardly from the shaft. This can be achieved by a suitable stamping operation.

In Figs. 4 and 6, instead of forming the shaft 46 integral with the body or handle 42 of the dial device 40, it can be tapered on one end and forced into an aperture formed in one end thereof. The crown 50, with the taper 52, is then formed on the end 56 of the shaft 46 by a suitable stamping operation.

It is to be emphasized that the spherical shaped element 20 or 44 is of slightly larger diameter than the diameter of the apertures in the flat disc 12, and that the crown 50 is approximately one half the diameter of the spherical shaped element 20 or 44.

The self-holding telephone dial device 16 or 40 can be formed of suitable metal, such as aluminum or steel, or of a synthetic plastic material, or combinations thereof.

Obviously many modifications and variations of the present invention are possible in light of the above teachings. It is, therefore, to be understood that within the scope of the appended claims the invention may be practiced otherwise than as specifically described.

What is claimed is:

1. A self-holding telephone dialing device, comprising, structure defining a handle, a shaft mounted at one end of said handle, and a spherical shaped element mounted for rotation on said shaft, the free end of said shaft having a frusto-conical taper expanding outwardly from said shaft to hold said spherical shaped element on said shaft.

2. A self-holding telephone dialing device, comprising, structure defining a handle of triangular cross-section, said handle having a reduced portion at one end defining a shaft, and a spherical shaped element mounted for rotation on said shaft, the free end of said shaft having a frusto-conical taper expanding outwardly from said shaft to hold said spherical shaped element on said shaft adjacent to said handle.

3. A self-holding telephone dialing device, comprising, structure defining an elongated shaped handle, having a reduced portion at one end, and a spherical shaped element mounted for rotation on said reduced portion of said handle, the free end of said reduced portion of said handle having a taper expanding outwardly therefrom to hold said device in an aperture in a flat disc arrangement of a telephone dial.

4. A self-holding telephone dialing device for use with a dial telephone having a stationary number plate and a rotatable flat disc spaced from said plate and having apertures therein, comprising, structure defining an elongated shaped handle having a reduced portion at one end thereof, and an element mounted for rotation on said reduced portion of said handle, said element being of greater diameter than the diameter of said aperture, the free end of said reduced portion of said handle having a frusto-conical taper expanding outwardly therefrom, whereby when said device is positioned in an aperture of said disc, the weight thereof causes said tapered portion to engage said disc so as to retain said device in the selected aperture.

5. An arrangement as recited in claim 4, wherein said element is of spherical shape.

6. An arrangement as recited in claim 4, wherein said reduced portion of said handle is formed integral therewith and of circular cross-section.

References Cited in the file of this patent

UNITED STATES PATENTS

| | | |
|---|---|---|
| 2,453,272 | Savoie | Nov. 9, 1948 |
| 2,528,661 | Lynn et al. | Nov. 7, 1950 |
| 2,601,129 | Sams | June 17, 1952 |
| 2,739,188 | O'Connell | Mar. 20, 1956 |